US006219089B1

(12) United States Patent
Driscoll, Jr. et al.

(10) Patent No.: US 6,219,089 B1
(45) Date of Patent: Apr. 17, 2001

(54) METHOD AND APPARATUS FOR ELECTRONICALLY DISTRIBUTING IMAGES FROM A PANOPTIC CAMERA SYSTEM

(75) Inventors: Edward Driscoll, Jr., Portola Valley; Howard Morrow, San Jose; Alan J. Steinhauer; Willard Curtis Lomax, both of Sunnyvale, all of CA (US)

(73) Assignee: Be Here Corporation, Cupertino, CA (US)

( * ) Notice: Subject to any disclaimer, the term of this patent is extended or adjusted under 35 U.S.C. 154(b) by 0 days.

(21) Appl. No.: 09/344,528

(22) Filed: Jun. 24, 1999

Related U.S. Application Data

(63) Continuation of application No. 08/852,920, filed on May 8, 1997, now Pat. No. 6,043,837.

(51) Int. Cl.[7] ............................. H04N 5/30; H04N 7/18
(52) U.S. Cl. ........................... 348/36; 348/7; 348/15; 348/39
(58) Field of Search ..................... 348/36, 38, 39, 348/7, 15; H04N 5/30, 7/18

(56) References Cited

U.S. PATENT DOCUMENTS

| Re. 36,207 | * | 5/1999 | Zimmermann et al. ............... 348/36 |
| D. 263,716 | | 4/1982 | Globus et al. . |
| D. 312,263 | | 11/1990 | Charles . |
| 2,146,662 | | 2/1939 | Van Albada . |
| 2,244,235 | | 6/1941 | Ayres . |
| 2,628,529 | | 2/1953 | Braymer . |
| 2,654,286 | | 10/1953 | Cesar . |
| 3,203,328 | | 8/1965 | Brueggemann . |
| 3,205,777 | | 9/1965 | Brenner . |
| 3,229,576 | | 1/1966 | Rees . |
| 3,785,715 | | 1/1974 | Mecklenborg . |
| 3,832,046 | | 8/1974 | Mecklenborg . |
| 3,846,809 | | 11/1974 | Pinzone et al. . |
| 3,934,259 | | 1/1976 | Krider . |
| 4,012,126 | | 3/1977 | Rosendahl et al. . |

(List continued on next page.)

FOREIGN PATENT DOCUMENTS

| 1234341 | 5/1960 | (FR) . |
| 2289820 | 11/1995 | (GB) . |

OTHER PUBLICATIONS

Charles, Jeffrey R., "All–Sky Reflector with "Invisible" Camera Support", Images from 1988 RTMC Proceedings, pp. 79–80.

(List continued on next page.)

Primary Examiner—Howard Britton
(74) Attorney, Agent, or Firm—Dag H. Johnansen; Daniel B. Curtis

(57) ABSTRACT

An electronic image distribution apparatus for distributing panoramic images is disclosed. The central feature of the system is a panoramic image server coupled to a source of panoramic image information. The source of panoramic image frames may be a panoramic image storage device or a panoramic camera system. The panoramic image server converts the panoramic image frames into a format that is more conducive for electronic transmission. Specifically, the panoramic image server extracts a subset of each panoramic image frame and compresses that subset of the panoramic image. The panoramic image server may also geometrically transform the subset of the panoramic image frame. The compressed subset of a panoramic image frame is transmitted across a transmission medium to a client system. The client system decompresses the subset of panoramic image frame and displays the subset of the panoramic image frame. To conserve bandwidth, the panoramic image server compresses a large portion of the panoramic image frame and leaves a smaller portion of the panoramic image frame. The smaller portion of the panoramic image frame is later expanded by the client system.

46 Claims, 9 Drawing Sheets

U.S. PATENT DOCUMENTS

| | | |
|---|---|---|
| 4,017,145 | 4/1977 | Jerie . |
| 4,038,670 | 7/1977 | Seitz . |
| 4,058,831 | 11/1977 | Smith . |
| 4,078,860 | 3/1978 | Globus et al. . |
| 4,157,218 | 6/1979 | Gordon et al. . |
| 4,190,866 | 2/1980 | Luknar . |
| 4,241,985 | 12/1980 | Globus et al. . |
| 4,395,093 | 7/1983 | Rosendahl et al. . |
| 4,429,957 | 2/1984 | King . |
| 4,463,380 | 7/1984 | Hooks, Jr. . |
| 4,561,733 | 12/1985 | Kreischer . |
| 4,566,763 | 1/1986 | Greguss . |
| 4,578,682 | 3/1986 | Hooper et al. . |
| 4,593,982 | 6/1986 | Rosset . |
| 4,602,857 | 7/1986 | Woltz et al. . |
| 4,656,506 | 4/1987 | Ritchey . |
| 4,661,855 | 4/1987 | Gulck . |
| 4,670,648 | 6/1987 | Hall et al. . |
| 4,728,839 | 3/1988 | Coughlan et al. . |
| 4,742,390 | 5/1988 | Francke et al. . |
| 4,751,660 | 6/1988 | Hedley . |
| 4,754,269 | 6/1988 | Kishi et al. . |
| 4,761,641 | 8/1988 | Schreiber . |
| 4,772,942 | 9/1988 | Tuck . |
| 4,858,002 | 8/1989 | Zobel . |
| 4,864,335 | 9/1989 | Corrales . |
| 4,868,682 | 9/1989 | Shimizu et al. . |
| 4,901,140 | 2/1990 | Lang et al. . |
| 4,907,084 | 3/1990 | Nagafusa . |
| 4,908,874 | 3/1990 | Gabriel . |
| 4,918,473 | 4/1990 | Blackshear . |
| 4,943,821 | 7/1990 | Gelphman et al. . |
| 4,943,851 | 7/1990 | Lang et al. . |
| 4,945,367 | 7/1990 | Blackshear . |
| 4,974,072 | 11/1990 | Hasegawa . |
| 4,985,762 | 1/1991 | Smith . |
| 5,016,109 | 5/1991 | Gaylord . |
| 5,021,813 | 6/1991 | Corrales . |
| 5,023,725 | 6/1991 | McCutchen . |
| 5,038,225 | 8/1991 | Maeshima . |
| 5,040,055 | 8/1991 | Smith . |
| 5,048,102 | 9/1991 | Tararine et al. . |
| 5,067,019 | 11/1991 | Juday et al. . |
| 5,068,735 | 11/1991 | Tuchiya et al. . |
| 5,083,389 | 1/1992 | Alperin . |
| 5,097,325 | 3/1992 | Dill . |
| 5,115,266 | 5/1992 | Troje . |
| 5,130,794 | 7/1992 | Ritchey . |
| 5,142,354 | 8/1992 | Suzuki et al. . |
| 5,153,716 | 10/1992 | Smith . |
| 5,166,878 | 11/1992 | Poelstra . |
| 5,173,948 | 12/1992 | Blackham et al. . |
| 5,175,808 | 12/1992 | Sayre . |
| 5,185,667 | 2/1993 | Zimmerman . |
| 5,187,571 | 2/1993 | Braun et al. . |
| 5,189,528 | 2/1993 | Takashima et al. . |
| 5,200,818 | 4/1993 | Neta et al. . |
| 5,231,673 | 7/1993 | Elenga . |
| 5,259,584 | 11/1993 | Wainwright . |
| 5,262,852 | 11/1993 | Eouzan et al. . |
| 5,262,867 | 11/1993 | Kojima . |
| 5,305,035 | 4/1994 | Schonherr et al. . |
| 5,313,306 | 5/1994 | Kuban et al. . |
| 5,315,331 | 5/1994 | Ohshita . |
| 5,341,218 | 8/1994 | Kaneko et al. . |
| 5,348,588 | 9/1994 | Martin . |
| 5,359,363 | 10/1994 | Kuban et al. . |
| 5,384,588 | 1/1995 | Martin et al. . |
| 5,396,583 | 3/1995 | Chen et al. . |
| 5,422,987 | 6/1995 | Yamada . |
| 5,473,474 | 12/1995 | Powell . |
| 5,495,576 | 2/1996 | Ritchey . |
| 5,508,734 | 4/1996 | Baker et al. . |
| 5,539,483 | 7/1996 | Nalwa . |
| 5,563,650 | 10/1996 | Poelstra . |
| 5,601,353 | 2/1997 | Naimark et al. . |
| 5,627,675 | 5/1997 | Davis et al. . |
| 5,631,778 | 5/1997 | Powel . |
| 5,649,032 | 7/1997 | Burt et al. . |
| 5,686,957 | 11/1997 | Baker . |
| 5,714,997 | 2/1998 | Anderson . |
| 5,760,826 | 6/1998 | Nayer . |
| 5,877,801 | 3/1999 | Martin et al. . |
| 5,990,934 * | 11/1999 | Nalwa ................................. 348/36 |
| 5,990,941 * | 11/1999 | Jackson et al. .................... 348/36 X |
| 6,043,837 * | 3/2000 | Driscoll ............................... 348/36 |

OTHER PUBLICATIONS

Roger W. Sinnott, "Scientific Library Gleanings for ATM's," *Sky & Telescope*, Aug. 1986, pp. 184&186.

Charles, et al., "How to build and use an All–Slu Camera," *Astronomy*, Apr. 1987, pp. 64–70.

Deutsch, Claudia H., "One Camera That Offers Many Views," The New York Times.

R. Colin Johnson, "Imaging System Sees All", Electronic Engineering Times, Dec. 25, 1996, pp. 1, 98.

"Panospheric Camera Expands Horizon", 1 page.

Supplemental Information Disclosure Statement in re the Application of Steven D. Zimmerman, et al., U.S. application No. 08/662,410 filed Jul. 12, 1996, 6 pgs. including PTO–1449 form.

Copy of PTO–1449 form filed with PTO on Nov. 4, 1996 in re the Application of Steven D. Zimmerman et al., U.S. application No. 08/662,410, filed Jul. 12, 1996, 2 pgs., citing 19 refs.

Defendant IPI's Notice of Reliance of Prior Art and Witnesses, Civil Action of Interactive Pictures Corporation, f/k/a Omniview, Inc. v. Infinite Pictures, Inc. and Bill Tilman, Case No. 3–96–849 filed Dec. 8, 1997, in U.S.D.C., Eastern District of Tennessee, 5 pgs.

Plaintiff's Rule 26(a)(3) Disclosures, Civil Action of Interactive Pictures Corporation, f/k/a Omniview, Inc. v. Infinite Pictures, Inc. and Bill Tillman, Case No. 3–96–849, filed Dec. 8, 1997, in U.S.D.C. Eastern District of Tennessee, 31 pgs.

Plaintiff's Supplemental Trial Exhibit List, Civil Action of Interactive Pictures Corporation, f/k/a Omniview, Inc. v. Infinite Pictures, Inc. and Bill Tillman, Case No. 3–96–849, filed Jan. 1, 1998, in U.S.D.C., Eastern District of Tennessee, 41 pgs.

Ripley, G. David, "DVI–A Digital Multimedia Technology", Communications of the ACM, Jul. 1989, vol. 32, No. 7, pp. 811–820.

Cnoe M. and Kuno Y., "Digital Processing CF Images Taken by Fish–Eye Lens", 1982 IEEE, pp. 105–108.

Hamit, F., "Near–Fisheye CCD Camera Broadens View for Imaging", Advanced Imaging, Mar. 1993, pp. 50–53.

Dixon, D. et al., "DVI Video/Graphics", Computer Graphics World, reprinted from the Jul. 1987 edition of Computer Graphics World, 4 pgs.

Upstill, Steve, "Building Strong Images", UNIX Review, Oct. 1988, vol. 6, No. 10, pp. 63–73.

Greene, N., "Environment Mapping and Other Applications of World Projections", Computer Graphics and Applications, Nov. 1986, IEEE Computer Society, vol. 6, No. 11, pp. 21–29.

Heckbert, P., "The PMAT and Poly User's Manual", Computer Graphics Lab, N.Y.I.T., Feb. 18, 1983, pp. 1–29.

Heckbert, P., "Fundamentals of Texture Mapping and Image Warping", Master's Thesis, Jun. 17, 1989, 86 pgs.

Rebiai, M. et al., "Image Distortion from Zoom Lenses: Modeling and Digital Correction", International Broadcasting Convention, IEEE, Jul. 1992.

* cited by examiner

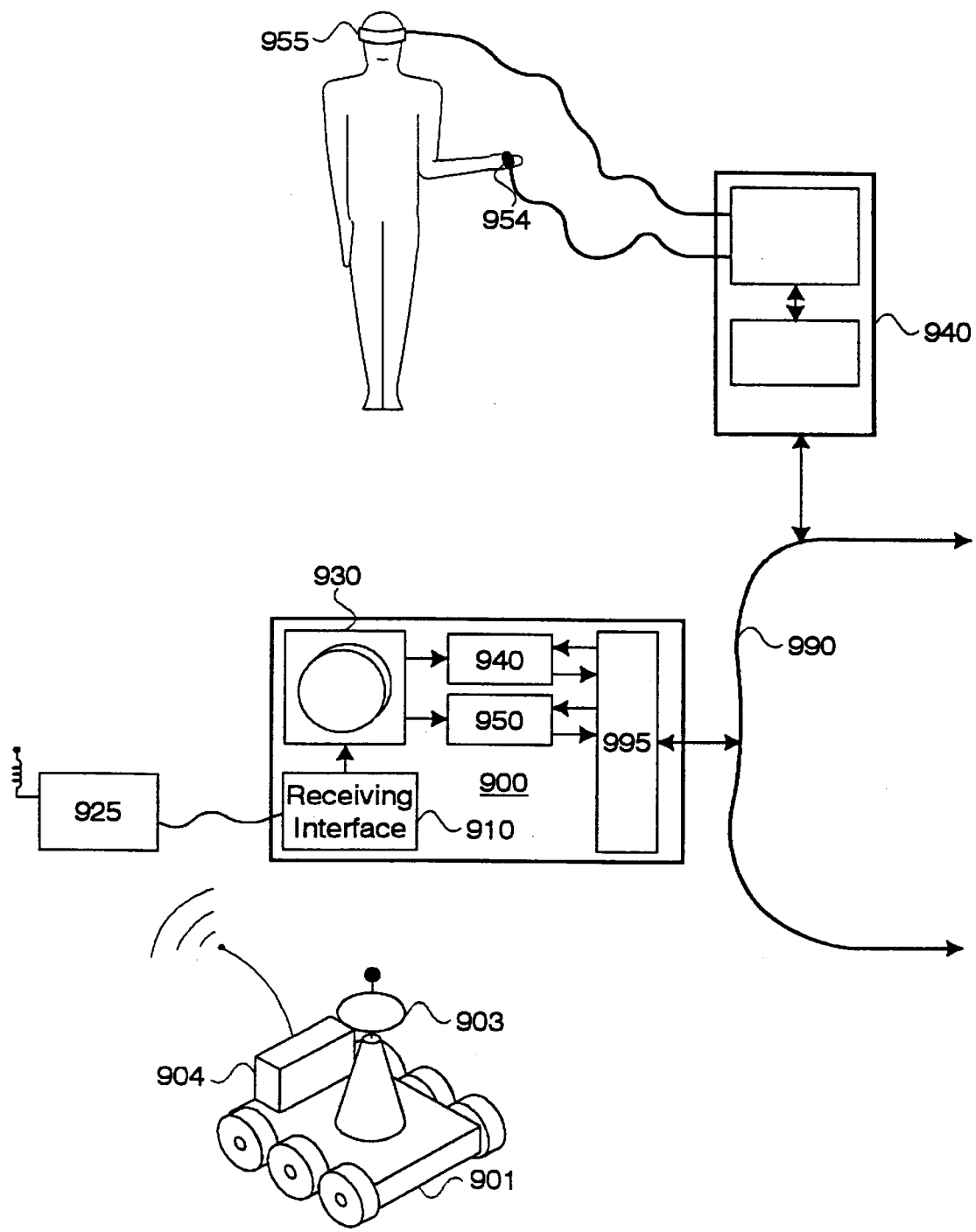

METHOD AND APPARATUS FOR ELECTRONICALLY DISTRIBUTING IMAGES FROM A PANOPTIC CAMERA SYSTEM

This is a continuation of application Ser. No. 08/852,920, filed May 8, 1997 now U.S. Pat. No. 6,043,837.

FIELD OF THE INVENTION

The present invention relates to the field of image processing. In particular the present invention discloses methods and apparatus for capturing, processing, transmitting, and post-processing panoramic image information.

BACKGROUND OF THE INVENTION

Most cameras only record a small viewing angle. Thus, a typical conventional camera only captures an image in the direction that the camera is aimed. Such conventional cameras force viewers to look only at what the camera operator chooses to focus on. Some cameras use a specialized wide angle lens or "fish-eye" lens to capture a wider panoramic image. However, such panoramic cameras still have a relatively limited field.

In many situations, it would be much more desirable to have a camera system that captures light from all directions. By capturing light from all directions, full view panoramic images can be created. One method of displaying a full view panoramic image is to "unwrap" the 360 degree view onto a flat rectangular image. By displaying a full view panoramic image, the viewer could then determine what to look at.

A full view panoramic image consists of a very large amount of information. To electronically distribute a full view panoramic image would thus require a very large bandwidth channel between the transmitter and the receiver. It would thus be desirable to have an electronic distribution system that efficiently distributes information from full view panoramic images.

SUMMARY OF THE INVENTION

The present invention discloses an electronic image distribution apparatus for distributing panoramic images. The main portion of the apparatus is a panoramic image server that has a source of panoramic images. The source of panoramic image frames may be a panoramic image storage device or a connection to a of panoramic camera system. The server converts the panoramic image frames into a format that is more conducive for electronic transmission. Specifically, the server extracts a subset of each panoramic image frame and compresses that subset of each panoramic image. The server may also geometrically transform the subset of each panoramic image frame. The compressed subset of a panoramic image frame is transmitted across a transmission medium to a client system. The client system decompresses the subset of panoramic image frame and displays the subset of the panoramic image frame. To conserve bandwidth, the server compresses a large portion of the panoramic image frame and leaves a smaller portion of the panoramic image frame. The smaller portion of the panoramic image frame is later expanded by the client system.

Other objects, features and advantages of present invention will be apparent from the company drawings and from the following detailed description that follows below.

BRIEF DESCRIPTION OF THE DRAWINGS

The objects, features and advantages of the present invention will be apparent to one skilled in the art, in view of the following detailed description in which:

FIG. 9 illustrates an embodiment of a panoptic camera and a panoramic motion image server in use in a remote exploration context.

DETAILED DESCRIPTION OF THE PREFERRED EMBODIMENT

A method and apparatus for a panoramic camera system that instantaneously captures 360 degree panoramic images and distributes the images electronically is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Charge Coupled Devices. However, the panoramic camera system can easily be implemented with other types of electronic image capture systems.

The Basic Panoramic Camera Design

Figure 1:
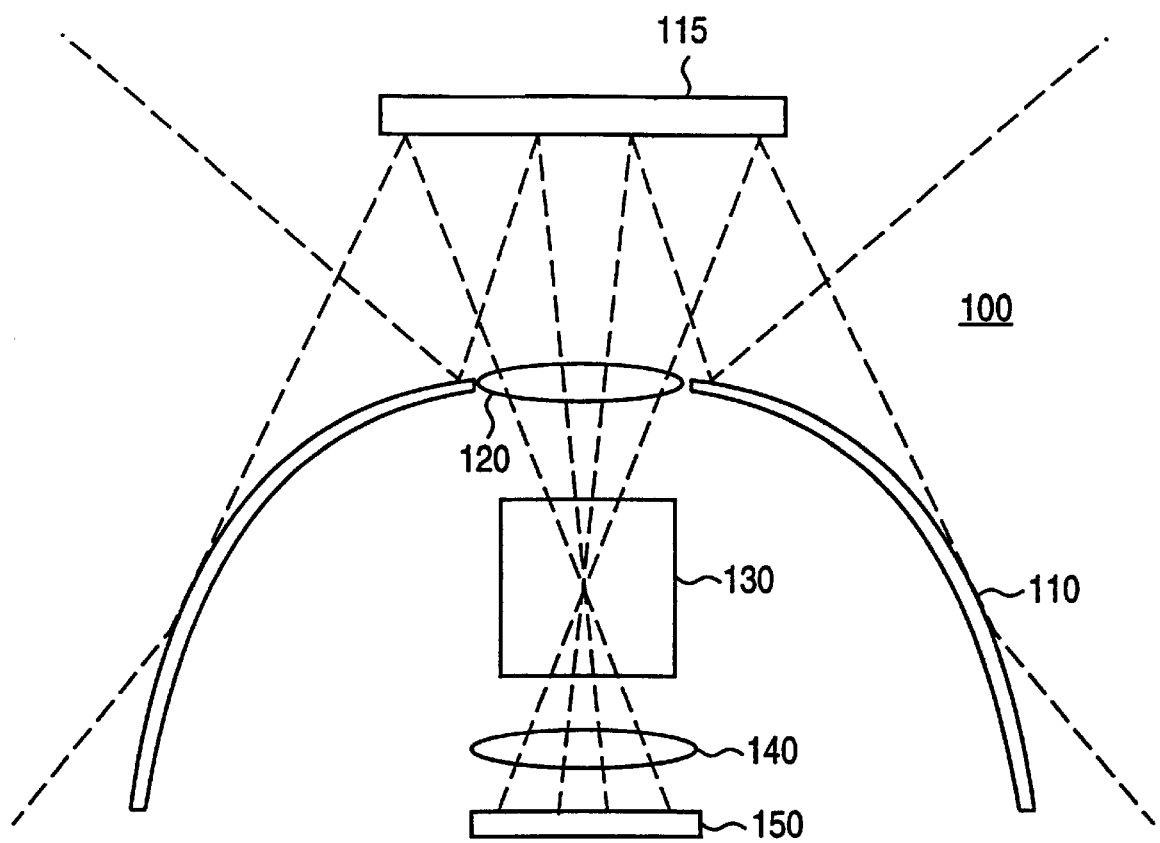
FIG. 1 illustrates one embodiment of a panoramic camera system.

FIG. 1 illustrates one embodiment of a 360 degree panoramic camera system. The image capture mechanism 150 of the panoramic camera system captures an angular image of the surrounding panorama that is reflected off the main reflector 110.

Figure 2A:
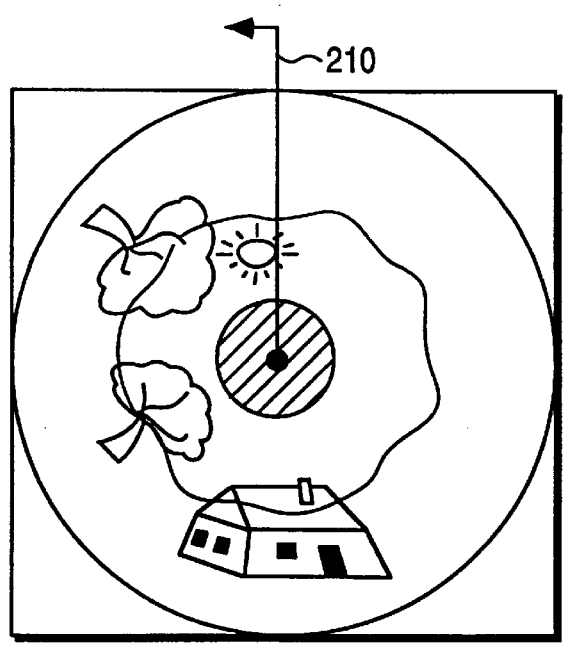
FIG. 2a illustrates an annular image that is recorded by the panoramic camera system of FIG. 1.
Figure 2B:
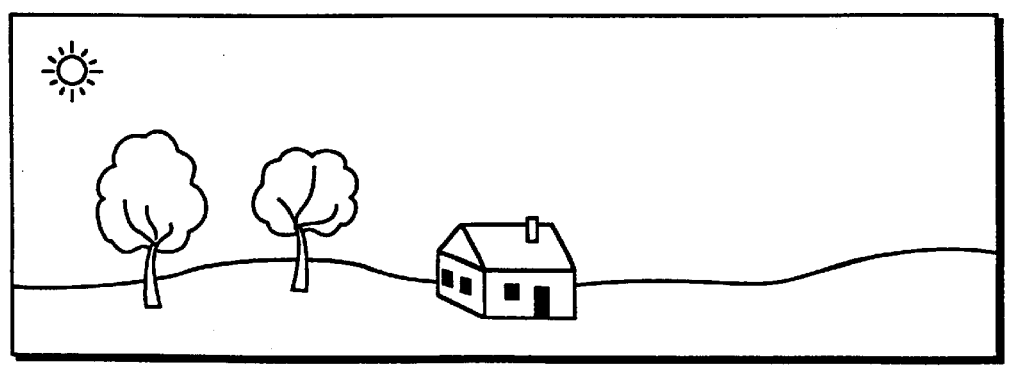
FIG. 2b illustrates how the annular image of FIG. 2a appears after it has been unwrapped by geometrical transformation software.

FIG. 2a illustrates an example of a panoramic image captured as an annular image. As illustrated in FIG. 2a, the surrounding panorama is distorted by the main reflector to be represented as a two-dimensional an annular image. In one embodiment, the shape of the main reflector transforms the standard rectangular coordinate system of the image into a polar coordinate system. To view the panoramic image captured as an annular image, the annular image is unwrapped to create a rectangular projection. The unwrapping is performed using a geometric transformation operation. FIG. 2b illustrates how the annular image of FIG. 2b appears after the images are geometrically transformed from the annular representation to a rectangular projection image. To generate a rectangular projection image of acceptable quality, the annular image needs to be captured with a high resolution image capture mechanism 150.

Figure 3:
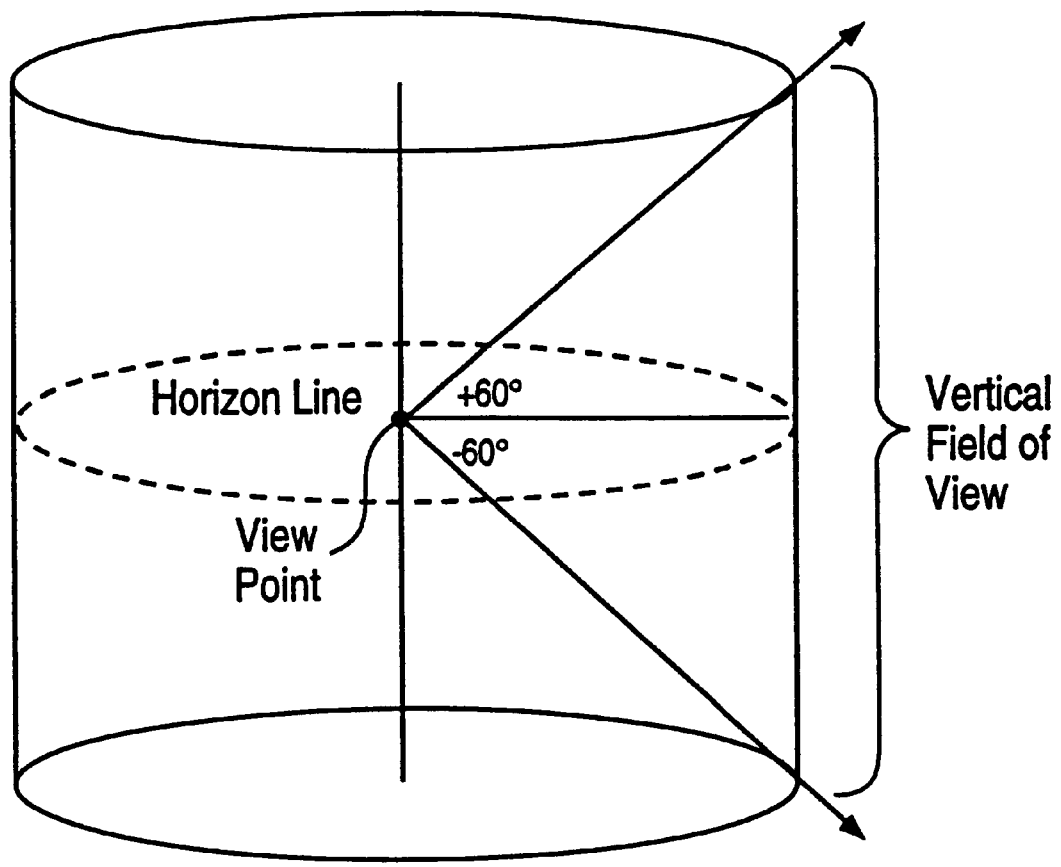
FIG. 3 illustrates the 360 degree band that the panoramic camera system of FIG. 1 captures.

The panoramic camera system of FIG. 1 captures an entire 360 degree image of the surrounding horizon as illustrated in FIG. 3. The panoramic camera system captures a panoramic image that includes a objects as low as 60 degrees below the horizon and objects as high as 60 degrees above the horizon.

A Motion Panoramic Image Capture System

Figure 4:
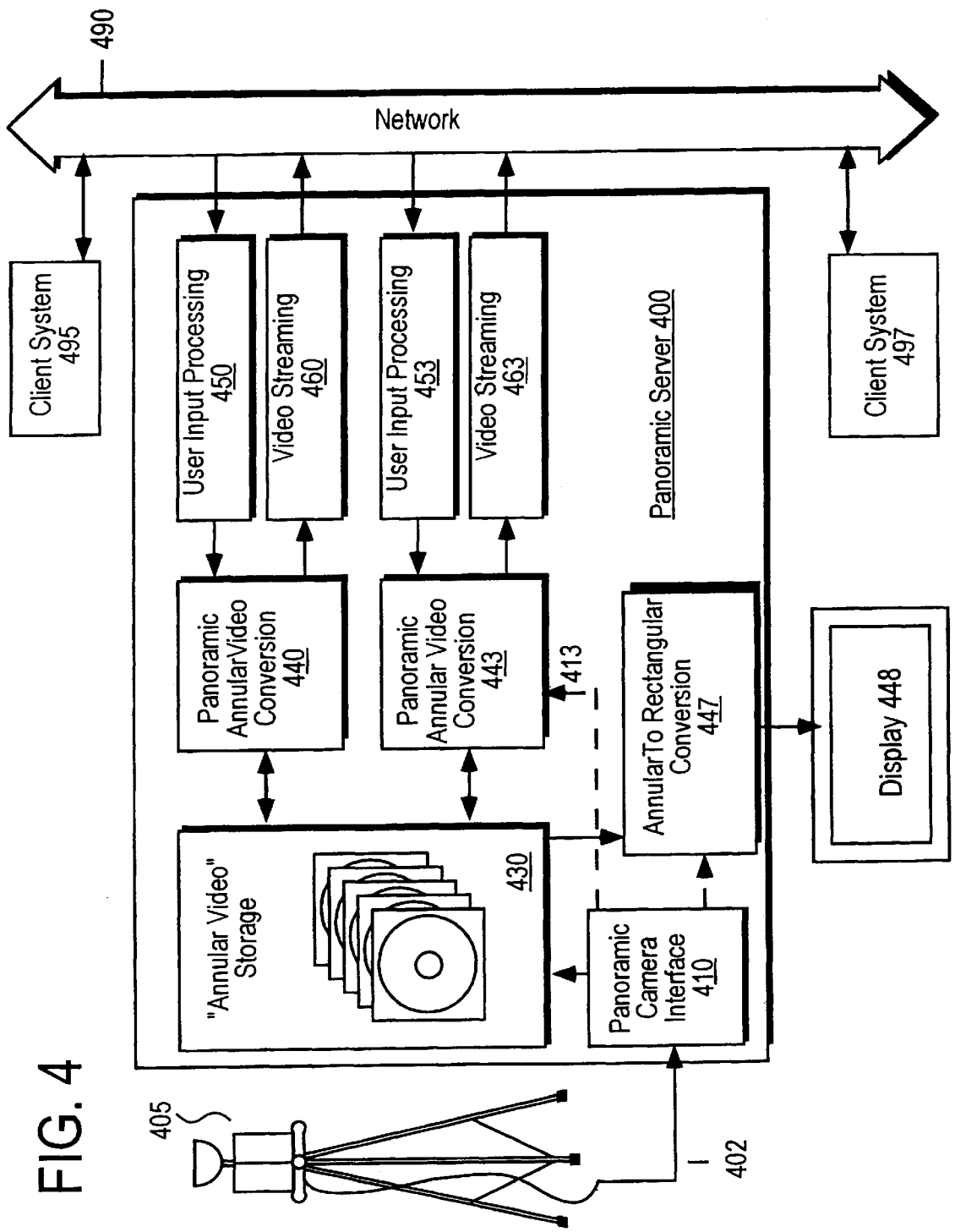
FIG. 4 illustrates a networked computer arrangement used to distribute motion panoramic images captured by the panoramic camera system FIG. 3.

When the image capture mechanism 150 of the panoramic camera of FIG. 1 is an electronic image capture mechanism such as charged coupled device or a film-based motion picture image capture system, then it is possible to capture a series of panoramic annular images. The series of panoramic annular images can be used to generate a motion panoramic display. FIG. 4 illustrates an example of an electronic motion panoramic image capture system.

Referring to FIG. 4, a panoramic camera system 405 captures a series of panoramic annular image frames with an electronic image capture mechanism. For example, the electronic image capture mechanism can be a charged coupled device (CCD) image capture mechanism that generates digitized panoramic annular image frames. The panoramic annular image frames are transmitted from panoramic camera system 405 to a panoramic image server 400 across a high bandwidth communication link 402. The communication link must be high bandwidth since each panoramic annular image frame contains a large amount of information and to provide a flicker-free motion image, several panoramic images per second must be transmitted.

Motion Panoramic Image Display

Once the panoramic annular image frames are received by the panoramic image server 400, the panoramic annular image frames may be stored as panoramic "annular video" frames in an "annular video" storage device 430. The panoramic annular video will consume large amounts of storage space very quickly.

With a high speed geometrical transformation program 447, the panoramic annular video images can be converted into a rectangular projection motion picture images. The high speed geometrical transformation program may read the panoramic annular image frames directly from the panoramic camera interface 410 or from the annular video storage device 430.

The transformed rectangular projection images generated by the high speed polar coordinate to rectangular coordinate device or program can be displayed on a display 448 such as a high resolution computer monitor or a high definition television (HDTV).

Video Subset Display of Panoramic Images

FIG. 4 also illustrates a second method of displaying motion pictures captured from a panoramic camera system. Specifically, FIG. 4 also illustrates system that extracts a subset of panoramic annular image frame information and distributes that subset of information as video frames. The video frames can be formatted for displayed on existing television screens and computer monitors.

Referring to FIG. 4, a panoramic annular video conversion device or program 440 reads panoramic annular video images from the panoramic annular video storage 430 and converts the panoramic annular video images to a video format. Alternatively, the panoramic annular video conversion device or program 440 may receive the panoramic annular video images directly from the high speed communication line 402. The annular video converter can be controlled by a user that sends commands to the annular video converter. For example, a user may send commands that specify what portion of an annular image should be converted into a video format.

The annular video conversion may be performed by a program running on the panoramic server 400. Since each annular video conversion program only handles a subset of the annular image data, there many be multiple instances of annular video conversion programs running on the server such as annular video conversion program 440 and annular video conversion program 440. Thus, multiple users can access the same stream of panoramic image data.

A Standard Video Embodiment

Figure 5:
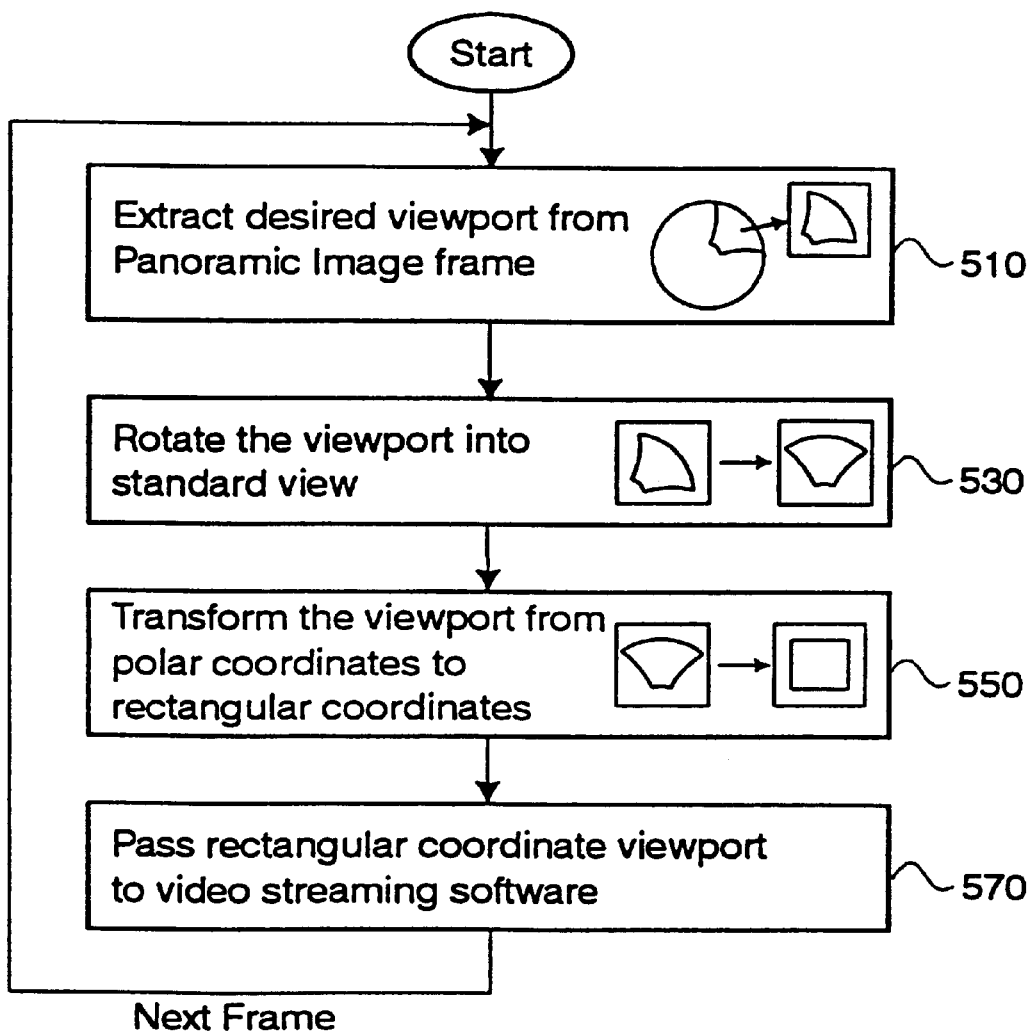
FIG. 5 illustrates a flow diagram that describes one embodiment of how a panoramic image frame can be translated into a standard video frame.

In one embodiment, the panoramic annular video conversion device or program 440 converts a portion of each panoramic annular image frame into a standard video frame. FIG. 5 describes the operation of such an embodiment. The first step is to extract a portion of the panoramic annular image that is a desired viewport.

After extracting a desired viewport, the annular video to standard video converter rotates the extracted viewport into a standard orientation as illustrated in step 530. After rotating the viewport, the annular video to standard video converter then geometrically transforms the information in the rotated viewport into a rectangular projection image at step 550. In one embodiment, the transformation transforms the annular image from a polar coordinate system into the rectangular coordinate system. At this point, a portion of an annular image frame has been transformed into a standard rectangular video frame.

Finally, at step 570, the annular video to standard video converter passes the rectangular coordinate viewport frame to video distribution or display software. For example, the standard video frame can be passed to an MPEG digital video encoder.

In the embodiment depicted in FIG. 4 and the flow diagram of FIG. 5, the video distribution software comprises network video streaming software 460. The network video streaming software 460 combines and compresses video frames and distributes the video information across a computer network in real-time. A corresponding video streaming client program at a client system 495 or 497 coupled to the computer network 490 can receive the streamed video information such that the video streaming client program decompresses and displays the video. Any one of a number of video streaming systems can be used including RealVideo by Progressive Networks, StreamWorks by Xing Technology, VivoActive by Vivo Software, VDOLive by VDONet Corporation, and Web Theater by Vxtreme, Inc.

An Improved Embodiment of a Panoramic Image Distribution System

The annular to video panoramic image distribution method described in FIG. 5 functions adequately. However, the distribution method described in FIG. 5 is not ideal for use on the Global Internet. Most users of the Global Internet are connected with relatively low bandwidth connections. Specifically, the most common current methods used to connect to the global internet include analog modems and ISDN lines. Using current commonly available technology, it is difficult to stream full motion video in real-time over low bandwidth connections. Thus, to improve upon the video distribution system, the present invention introduces a second annular video to standard video embodiment that reduces the amount of information that needs to be transmitted. Using the second embodiment, an improved video stream is distributed since the bandwidth is used more efficiently.

Figure 6:
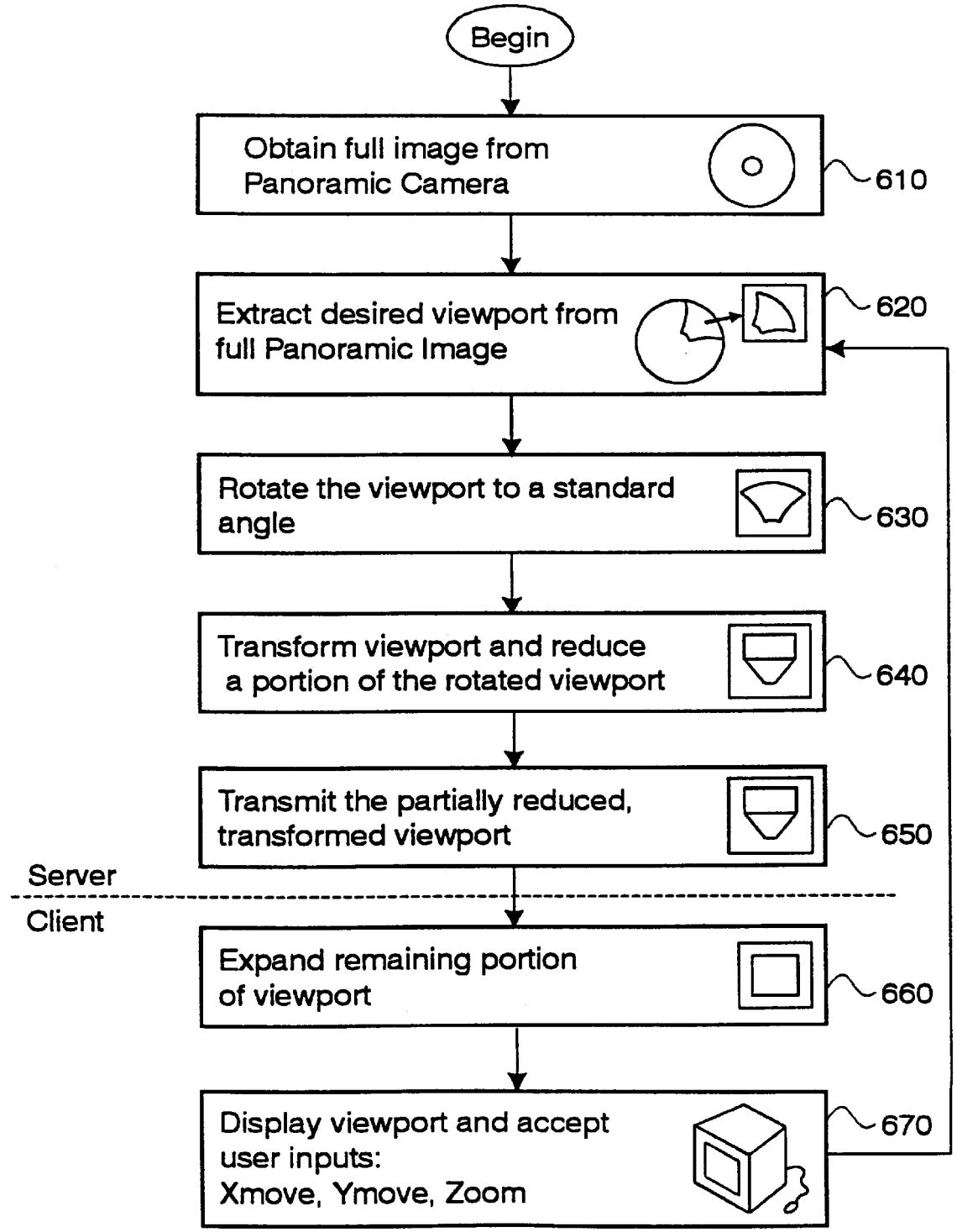
FIG. 6 illustrates a flow diagram that describes an improved method of translating and transmitting video frames from a panoramic camera system to a remote computer system.

FIG. 6 illustrates flow diagram describing an improved method of converting and transmitting a portion of a panoramic annular video frame to a receiving client system that displays a standard video frame. For completeness, the flow diagram illustrated in FIG. 6 describes the entire method including the steps performed by an panoramic image server that distributes image information and a panoramic image client system that receives the image information and displays a portion of a panoramic image as standard video.

First at step 610, a full frame of a panoramic annular image is obtained by an annular video conversion program within a panoramic image server. The annular video conversion program may access panoramic annular images from an annular video storage device 430 as depicted in FIG. 4 or the conversion program may access "live" panoramic annular images direction from a panoramic image source such as a panoramic camera interface 410.

Next, at step 620, the annular video conversion program extracts a desired viewport from the panoramic annular image frame. After extracting the desired viewport, the conversion program rotates the extracted viewport into a standard position at step 630.

After the viewport has been rotated into a standard angle, the conversion program then geometrically transforms the rotated viewport and reduces a portion of the transformed rotated viewport at step 640. The geometrical transformation converts the rotated viewport from an annular representation into rectangular projection representation. Part of the geometrically transformed representation will not fit within a standard rectangular video frame. Thus, the conversion program reduces the portion of the viewport that does not fit within the reduced viewport such that it fits within a standard rectangular video frame. After the geometrical transformation and the partial reduction of the rotated viewport, the amount of information is reduced since the wide outer perimeter portion of the viewport is reduced to fit into the rectangular viewport. For clarity, steps 620, 630, and 640 have been listed as separate individual steps. However, steps 620, 630, and 640 can be combined into a single transformation such that the steps are performed using a single matrix operation.

The transformed and partially reduced viewport is then transmitted from the server to a receiving client as illustrated in step 650. As illustrated in step 650, the transmitted viewport comprises a first portion that is rectangular and a second portion that does not have full lines of video information. The second portion consumes less space and correspondingly less bandwidth than the rectangular portion, since the second portion consists of information from the thin inner perimeter portion of the annular viewport as graphically illustrated in FIG. 6. The transformed and partially reduced viewport frames can be transmitted using modified or unmodified video streaming software.

After the server transmits the transformed and partially reduced viewport to the receiving client 495, the client system 495 performs the remaining steps of the method. At step 660 the client system expands the second portion viewport to fill the full rectangular space of the video frame. The expansion of the lower portion is a simple computational that can be performed by most client computer systems. The client system then displays the full rectangular video frame on a display screen coupled to the client system.

The expansion operation may be performed by a custom video streaming client program. Alternatively, the expansion operation can be performed by a simple Java applet on the client system. Using this technique, any standard video streaming plug-in application can be used. The expansion Java applet would simply post process each video frame after the streaming video plug-in has restored the compressed video frame.

As previously set forth, the client system can obtain command input from a viewer. The command input can described how the user wishes to modify the displayed images. For example, the user may use an input device such as a computer mouse to signal a desire to move the location of the viewport around within a panoramic image. The user may also signal a desire to zoom in on a particular portion the panoramic image.

The client collects the user's control signals and transmits the control signals back to the panoramic image server. The control signals will be interpreted by a user input processing program 450 in the panoramic image server such that panoramic image server sends a modified stream of information.

Scalable Client Server Panoramic Video Distribution

FIG. 6 described on embodiment of an improved panoramic image client-server system wherein the bandwidth is conserved. However, there is rarely a "standard" server and client environment. The clients, the server, and the network in a client-server environment may all vary depending on the circumstances. Examples of varying client-server embodiments will be described with reference to the client-server system illustrated in FIG. 4.

The clients in panoramic client server environment would likely consist of workstations and personal computers. The capabilities of each different panoramic client would vary depending upon the client systems specifications including the computer make, the processor type, the processor generation, the amount of random access memory available, and the bus speed.

Like the panoramic clients, the panoramic image server could be implemented using many different types computer systems. The capabilities of the server would depend upon the server's specifications including the processor type, the processor generation, the amount of random access memory available, the operating system and the bus speed. Furthermore, the available processing power of a particular server can vary depending on the number of clients that are connected to the server and other processes running on the server.

The network connection between the server and the client will also vary depending on the type of physical connection between the client and server. The network connection may be limited by a 14.4K modem line or the client and server may reside on the same high speed local area network. The network connection will vary with time. For example, a network may be heavily congested during the day but carry very little traffic at night. Thus, the bandwidth and latency characteristics of the network connection will vary.

Figure 7:
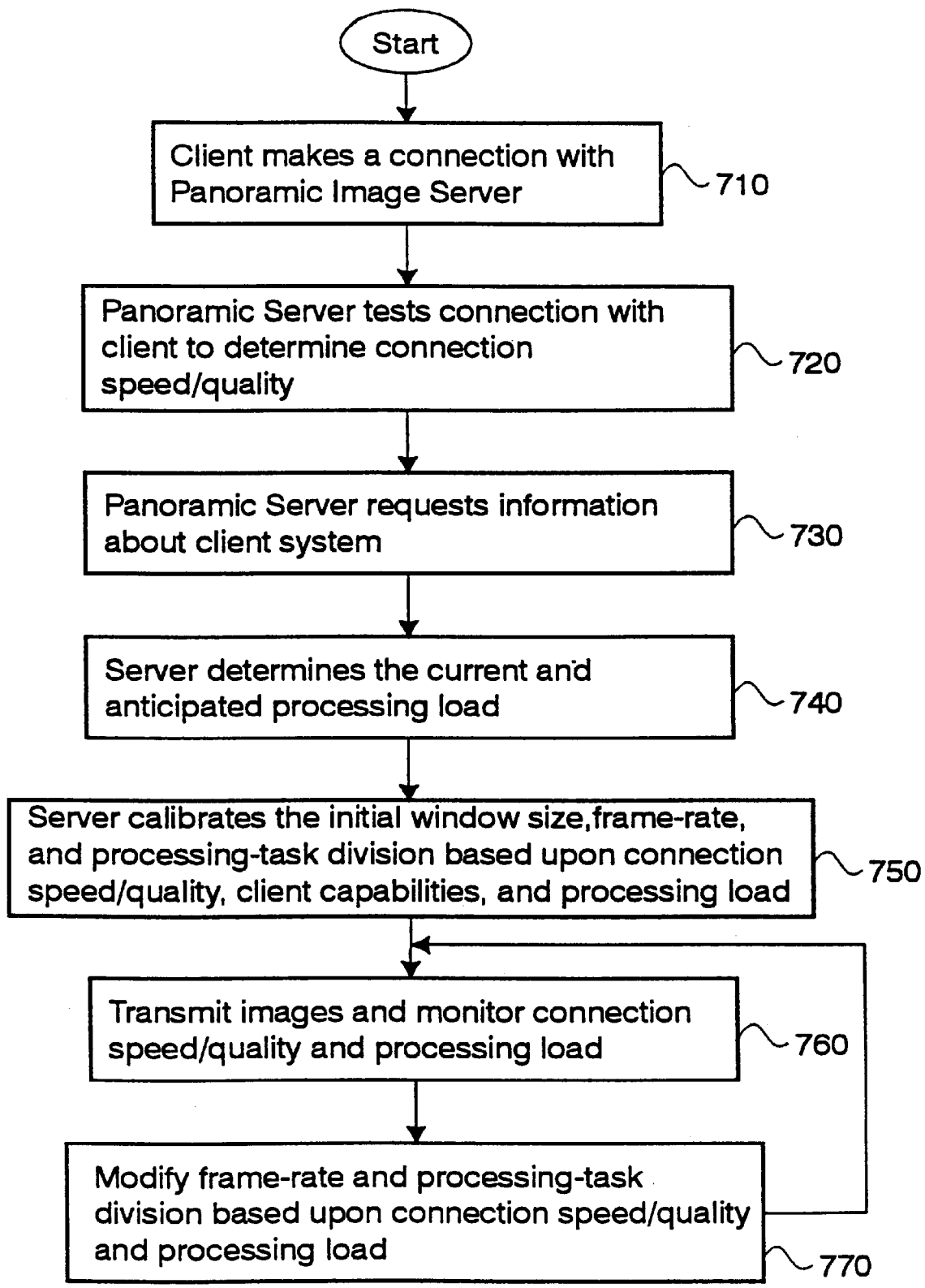
FIG. 7 illustrates a flow diagram that describes how a motion panoramic image server can communicate with a panoramic image client.

To most efficiently distribute panoramic image information from a panoramic image server to clients, the present invention introduces a client-server system that works on a sliding scale. The server system determines the characteristics of the server, client, and network connection situation before determining how the client-server system will operate. FIG. 7 illustrates a flow diagram describing the method of distributing panoramic image information from a panoramic camera in a manner that depends upon the client server and network connection.

Referring to FIG. 7, a client initiates a connection to a panoramic image server at step 710. In response to the client connection, the panoramic image server tests the network connection between the panoramic image server and the client to determine the connection quality at step 720. Specifically, the bandwidth and latency of the connection between the client and server is determined.

Next at step 730, the panoramic image server requests information about the client system. Specifically, the panoramic image server requests the client system to disclose information that will describe the processing capacity of the client. For example, the panoramic image server may request the processor type, the processor speed, and the amount of main memory available. The panoramic image server may also request information relevant describing the display characteristics the client. For example, the server may request the client's frame buffer size, the client's frame buffer color characteristics, and other information relevant to the display of images on the client system. The client responds by sending this information to the panoramic image server.

Then at step 740, the panoramic image server determines the current and anticipated processing load of the server. Specifically, the panoramic image server can determine the number of panoramic image connections that are currently operating and the number of panoramic image connections that can be made. The panoramic image server compares the processing load with the processing capability of the server.

At step 750, the panoramic image server uses the collected information to calibrate how the server will serve the client. For example, the panoramic image server will determine the initial video frame size, the video frame-rate, and a processing-task division based upon the network connection speed and quality, the capabilities of the client system, and the current and anticipated processing load of the image server. Thus, for example, if the connection between the server and the client has a small bandwidth, then the server will select a small window size for the panoramic image video. If the server determines that the client has significant processing capabilities, then the server will determine that the client will perform some of the processing needed to display the panoramic image onto the client screen. Table 1 lists some of the client connection characteristics that are examined and how those characteristics may affect the stream of information sent to the client.

TABLE 1

| Characteristic | Effect on the Client-Server connection |
|---|---|
| Slow network connection | Smaller Video Frame, slow frame rate |
| Fast network connection | Larger Video Frame, greater frame rate |
| Limited client color palette | Server generates limited color video |
| Limited client processing capacity | Server performs most processing |
| Large client processing capacity | Server performs less processing |
| Audio Required | Smaller Video Frame/Less colors |
| Audio Not Required | Larger Video Frame/More colors |

After the server has calibrated how the connection to the client will be used, the server begins transmitting image information to the client system at step 760. Since the connection to each client is uniquely calibrated, the server will transmit panoramic image information to each different client in a manner that is specific to that particular client.

As the server transmits image information to a client system, the server monitors the network connection quality and the processor load of the server. If the server determines if the network connection quality has changed sufficiently or the processing load of the image server has changed sufficiently, then the panoramic image server will change the parameters of the client connection based upon the connection speed and quality and a processing load of the server as stated in step 770. For example, the server may modify the frame-rate, the processing-task division, or the color palette based upon the changing conditions. Certain parameters such as frame size and audio will not change since adjusting these parameters would upset the user.

A First Example Use: Video Conferencing

Figure 8:
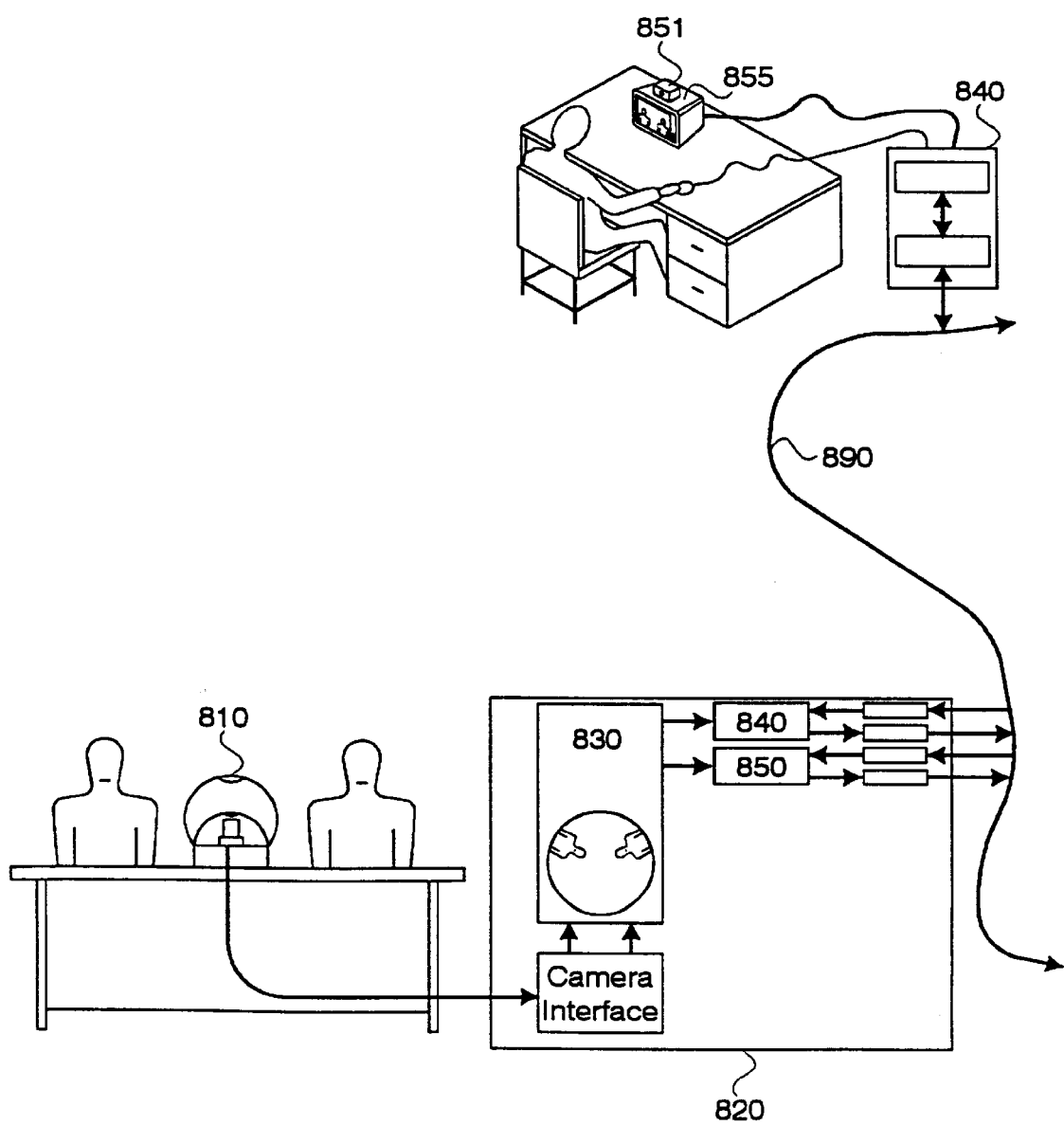
FIG. 8 illustrates an embodiment of a panoramic camera and a panoramic motion image server in use in a video conferencing application.

FIG. 8 illustrates an example use of the panoramic image video distribution system of the present invention. In FIG. 8, a panoramic camera system 810 is used in a conference room where two users wish to be in a video conference with another person located at a remote site. The panoramic camera system 810 includes a microphone for recording audio information in addition to the panoramic camera for recording panoramic annular images.

The panoramic camera system 810 is coupled to a panoramic image server computer 820. The panoramic camera server 820 contains the previously described components to serve standard video from the panoramic images collected from the panoramic camera system 810.

The panoramic image server 820 is coupled to a network 830. A network 830 can be any computer network such as, a local area Ethernet or a global internet. Also coupled to the computer network 830 is a client computer system 840. A client computer system 840 is used by a user who wishes to participate in a video conference with the users in the conference room with the panoramic camera 810. To enter into a video conference, the user of computer system 840 connects with the panoramic image server 820. The users client computer system 840 can thus display images from the video conference room on his local monitor 855. Furthermore, the user of client computer system 840 can have his own camera system 851 transmit video images to a monitor located in the conference room (not shown).

A Second Example Use: Telepresence

FIG. 9 illustrates a second example use of the panoramic image video distribution system of the present invention. In FIG. 9, a full view panoptic camera system 903 is mounted on a remote roving unit 901. Details on how to construct a full view panoptic camera system can be found in the copending patent application entitled "Method and Apparatus for Implementing A Panoptic Camera System" filed on May 8, 1997 with Ser. No. 08/853,048 that is hereby incorporated by reference. The panoptic camera system 903 transmits two annular images for each panoptic image "frame." The panoptic camera system 903 may include one or more microphones for collecting audio information in addition to visual information collected by the panoramic camera.

The remote roving unit 901 may be controlled by a user that sends wireless signals to the remote roving unit 901. Alternatively, the remote roving unit 901 may operate under its own control as would be necessary for space exploration uses wherein the vast distances would create control signal transmission delays that would prevent real-time control.

The panoptic camera system 910 is coupled to a transmitter 904 that modulates and transmits the collected audio and visual information in a wireless manner. The receiver 925 demodulates the audio and visual information and passes that information to a receiving interface 910 on panoramic image server computer 900. The panoramic image server 900 is similar to the previously described panoramic image servers except that the panoramic image server 900 must be configured to record two annular image for each transmitted panoramic image "frame."

The panoramic image server 900 records the two annular images for each panoptic frame in the annular video storage unit 930. To distribute images from the remote roving unit 901, conversion programs 940 and 950 can access the annular image frames and extract viewports from the annular image frames. For viewports around the horizon line, information from both annular images is combined.

As illustrated in the previous embodiments, the panoramic image server 920 can be coupled to a network 990 through a network interface 995. In FIG. 9 a client computer system 940 is coupled to the computer network 990. The client computer system 940 drives virtual reality headgear 955. Specifically, the client computer system 940 requests panoramic viewport information from the panoramic image server 900. The panoramic image server 900 transmits panoramic viewport information to the client computer system 940 which then displays the panoramic viewport information on the virtual reality headgear 955.

Sensors in the virtual reality headgear 955 can be used to determine the direction in which the viewer is looking. To calibrate the viewing direction, the direction of gravity vector is used. The viewing direction can be sent by client computer system 940 to the panoramic image server 900. Using the viewing direction, the panoramic image server 900 selects a viewport of information to send to the client computer system 940.

The client computer system 940 may also include an input device 954. The input device 954 can be used to send commands to the remote roving unit 901. Specifically, the user use the input device 954 to generate motion control commands (such as turn left, turn right, move forward) intended for the remote roving unit 901. The motion control commands would then be transmitted to the remote roving unit 901 using some wireless means. Alternatively, an input device 954 can be used to selected.

The foregoing has described methods and apparatuses for electronically distributing panoramic images. It is contemplated that changes and modifications may be made by one of ordinary skill in the art, to the materials and arrangements of elements of the present invention without departing from the scope of the invention.

We claim:

1. A computer controlled method of providing electronic images comprising steps of:
   extracting a subset of a panoramic image frame;
   reducing a first portion of said subset; and
   transmitting said first portion of said subset and a second portion of said subset over a network.

2. The method of claim 1 further comprising a step of geometrically transforming said subset from an annular representation to a rectangular projection representation.

3. The method of claim 1 wherein the step of extracting extracts said subset from a panoramic image storage device.

4. The method of claim 1 wherein the step of reducing reduces said first portion to fit within a standard video frame.

5. The method of claim 1 wherein the step of reducing geometrically transforms said first portion from an annular representation to a rectangular projection representation.

6. The method of claim 1 further comprising a step of receiving at least one command over said network, said at least one command used to specify an area of said panoramic image frame to be extracted as said subset.

7. A computer controlled method of receiving electronic images comprising steps of:
   receiving, over a network, a first portion of a subset of a panoramic image frame and a second portion of said subset; and
   expanding said second portion.

8. The method of claim 7 further comprising a step geometrically transforming said subset from an annular representation to a rectangular projection representation.

9. The method of claim 7 wherein the step of expanding is performed by a Java Applet executed by a computing device.

10. The method of claim 7 further comprising a step of presenting a video frame comprised of said first portion and said expanded second portion.

11. The method of claim 10 wherein the step of presenting is performed by displaying said video frame on a display device.

12. The method of claim 10 wherein the step of presenting is performed by storing said video frame on a computer readable media.

13. The method of claim 10 wherein the step of presenting is performed by storing said video frame on a data storage device.

14. The method of claim 7 further comprising a step of transmitting at least one command over said network, said at least one command used to specify an area of said panoramic image frame to be extracted as said subset.

15. An apparatus having a central processing unit (CPU) and a memory coupled to said CPU for providing electronic images, the apparatus comprising:
   a network interface that can be connected to a network;
   an image extraction mechanism configured to extract a subset of a panoramic image frame;
   a reduction mechanism configured to reduce a first portion of said subset extracted by the image extraction mechanism; and
   a transmission mechanism configured to transmit said first portion of said subset and a second portion of said subset using said network interface, the transmission mechanism responsive to the reduction mechanism.

16. The apparatus of claim 15 further comprising a transformation mechanism configured to geometrically transform said subset from an annular representation to a rectangular projection representation.

17. The apparatus of claim 15 wherein the image extraction mechanism is configured to extract said subset from a panoramic image storage device in communication with said CPU.

18. The apparatus of claim 15 wherein the reduction mechanism is configured to reduce said first portion to fit within a standard video frame.

19. The apparatus of claim 15 wherein the reduction mechanism further includes a transformation mechanism configured to geometrically transform said first portion from an annular representation to a rectangular projection representation.

20. The apparatus of claim 15 further comprising a receiver mechanism, in communication with the network interface, configured to receive at least one command over said network, said at least one command used to specify an area of said panoramic image frame to be extracted as said subset.

21. An apparatus having a central processing unit (CPU) and a memory coupled to said CPU for of receiving electronic images, the apparatus comprising:
- a network interface that can be connected to a network;
- a receiver mechanism configured to receive, through the network interface, a first portion of a subset of a panoramic image frame and a second portion of said subset; and
- an expansion mechanism, responsive to the receiver mechanism, configured to expand said second portion.

22. The apparatus of claim 21 further comprising a transformation mechanism configured to geometrically transform said subset from an annular representation to a rectangular projection representation.

23. The apparatus of claim 21 wherein the expansion mechanism executes a Java Applet.

24. The apparatus of claim 21 further comprising a presentation mechanism configured to present a video frame comprised of said first portion and said expanded second portion.

25. The apparatus of claim 24 wherein the presentation mechanism is a display device.

26. The apparatus of claim 24 wherein the presentation mechanism stores said video frame on a computer readable media.

27. The apparatus of claim 24 wherein the presentation mechanism is a data storage device.

28. The apparatus of claim 21 further comprising a sending mechanism configured to transmit at least one command through the network interface, said at least one command used to specify an area of said panoramic image frame to be extracted as said subset.

29. A computer program product including:
- a computer usable data carrier having computer readable code embodied therein for causing a computer to provide electronic images, said computer readable code including:
  - computer readable program code configured to cause said computer to effect a network interface that can be connected to a network;
  - computer readable program code configured to cause said computer to effect an image extraction mechanism configured to extract a subset of a panoramic image frame;
  - computer readable program code configured to cause said computer to effect a reduction mechanism configured to reduce a first portion of said subset extracted by the image extraction mechanism; and
  - computer readable program code configured to cause said computer to effect a transmission mechanism configured to transmit said first portion of said subset and a second portion of said subset using said network interface, the transmission mechanism responsive to the reduction mechanism.

30. The computer program product of claim 29 wherein the computer usable data carrier is a computer readable media.

31. The computer program product of claim 29 wherein the computer usable data carrier is a carrier wave.

32. The product of claim 29 further comprising computer readable program code configured to cause said computer to effect a transformation mechanism configured to geometrically transform said subset from an annular representation to a rectangular projection representation.

33. The product of claim 29 wherein the image extraction mechanism is configured to extract said subset from a panoramic image storage device in communication with said CPU.

34. The product of claim 29 wherein the reduction mechanism is configured to reduce said first portion to fit within a standard video frame.

35. The product of claim 29 wherein the reduction mechanism further includes a transformation mechanism configured to geometrically transform said first portion from an annular representation to a rectangular projection representation.

36. The product of claim 29 further comprising computer readable program code configured to cause said computer to effect a receiver mechanism, in communication with the network interface, configured to receive at least one command over said network, said at least one command used to specify an area of said panoramic image frame to be extracted as said subset.

37. A computer program product including:
- a computer usable data carrier having computer readable code embodied therein for causing a computer to present electronic images, said computer readable code including:
  - computer readable program code configured to cause said computer to effect a network interface that can be connected to a network;
  - computer readable program code configured to cause said computer to effect a receiver mechanism configured to receive, through the network interface, a first portion of a subset of a panoramic image frame and a second portion of said subset; and
  - computer readable program code configured to cause said computer to effect an expansion mechanism, responsive to the receiver mechanism, configured to expand said second portion.

38. The computer program product of claim 37 wherein the computer usable data carrier is a computer readable media.

39. The computer program product of claim 37 wherein the computer usable data carrier is a carrier wave.

40. The product of claim 37 further comprising computer readable program code configured to cause said computer to effect a transformation mechanism configured to geometrically transform said subset from an annular representation to a rectangular projection representation.

41. The product of claim 37 wherein the expansion mechanism executes a Java Applet.

42. The product of claim 37 further comprising computer readable program code configured to cause said computer to effect a presentation mechanism configured to present a video frame comprised of said first portion and said expanded second portion.

43. The product of claim 42 wherein the presentation mechanism is a display device.

44. The product of claim 42 wherein the presentation mechanism stores said video frame on a computer readable media.

45. The product of claim 42 wherein the presentation mechanism is a data storage device.

46. The product of claim 37 further comprising computer readable program code configured to cause said computer to effect a sending mechanism configured to transmit at least one command through the network interface, said at least one command used to specify an area of said panoramic image frame to be extracted as said subset.

* * * * *